(12) United States Patent
Morrison et al.

(10) Patent No.: US 7,157,914 B2
(45) Date of Patent: Jan. 2, 2007

(54) AIRBORNE ELECTROMAGNETIC TIME DOMAIN SYSTEM, COMPUTER PRODUCT AND METHOD

(76) Inventors: Edward Beverly Morrison, 626 Foxcroft Boulevard, Newmarket (CA) L3X 1N4; Petr Valentinovich Kuzmin, 62 Millcliff Circle, Aurora (CA) L4G 1N4; Pavel Tishin, 25 Fisherville Road, Apt. 1501, North York (CA) M2R 3B7

( * ) Notice: Subject to any disclaimer, the term of this patent is extended or adjusted under 35 U.S.C. 154(b) by 160 days.

(21) Appl. No.: 10/716,813

(22) Filed: Nov. 20, 2003

(65) Prior Publication Data

US 2005/0001622 A1 Jan. 6, 2005

(51) Int. Cl.
*G01V 3/16* (2006.01)
*G01V 3/165* (2006.01)
*H01Q 1/30* (2006.01)

(52) U.S. Cl. ..................... 324/330; 343/707
(58) Field of Classification Search ........... 324/330, 324/331, 323, 326, 329, 332, 334, 336, 344; 343/707, 705, 708
See application file for complete search history.

(56) References Cited

U.S. PATENT DOCUMENTS 3,978,396 A * 8/1976 Inouye et al. ............... 324/337
4,628,266 A 12/1986 Dzwinel
4,641,100 A * 2/1987 Dzwinel ..................... 324/330
5,119,028 A * 6/1992 Mooney et al. ............. 324/326
2002/0027438 A1 3/2002 Ott et al.
2003/0169045 A1* 9/2003 Whitton ..................... 324/330

FOREIGN PATENT DOCUMENTS

GB 899606 A 6/1962
RU 2201603 C 3/2003

* cited by examiner

*Primary Examiner*—Edward Lefkowitz
*Assistant Examiner*—Kenneth J. Whittington
(74) *Attorney, Agent, or Firm*—Eugene J. A. Gierczak

(57) ABSTRACT

An airborne time domain electromagnetic surveying system is provided. The system includes a tow assembly with a flexible support frame. The flexible support frame spaced apart from the aircraft includes a transmitter section with a transmitter loop and a receiver section with a sensor aligned with the central axis of the transmitter section. The flexible support frame has a lightweight modular structure that enables the surface area of the transmitter section to be increased and decreased to suit particular survey applications. The transmitter loop sends a pulse in an "ON" interval, and in an "OFF" interval the sensor measures the earth response to the pulse. The tow assembly also includes a sensor for generating selected survey data in the "ON" interval. A transmitter driver enables the creation of earth-bound pulse. The system components are linked to a computer and control computer program linked thereto for controlling the functions thereof. The invention also includes a method for producing survey data using the tow assembly of the invention.

27 Claims, 10 Drawing Sheets

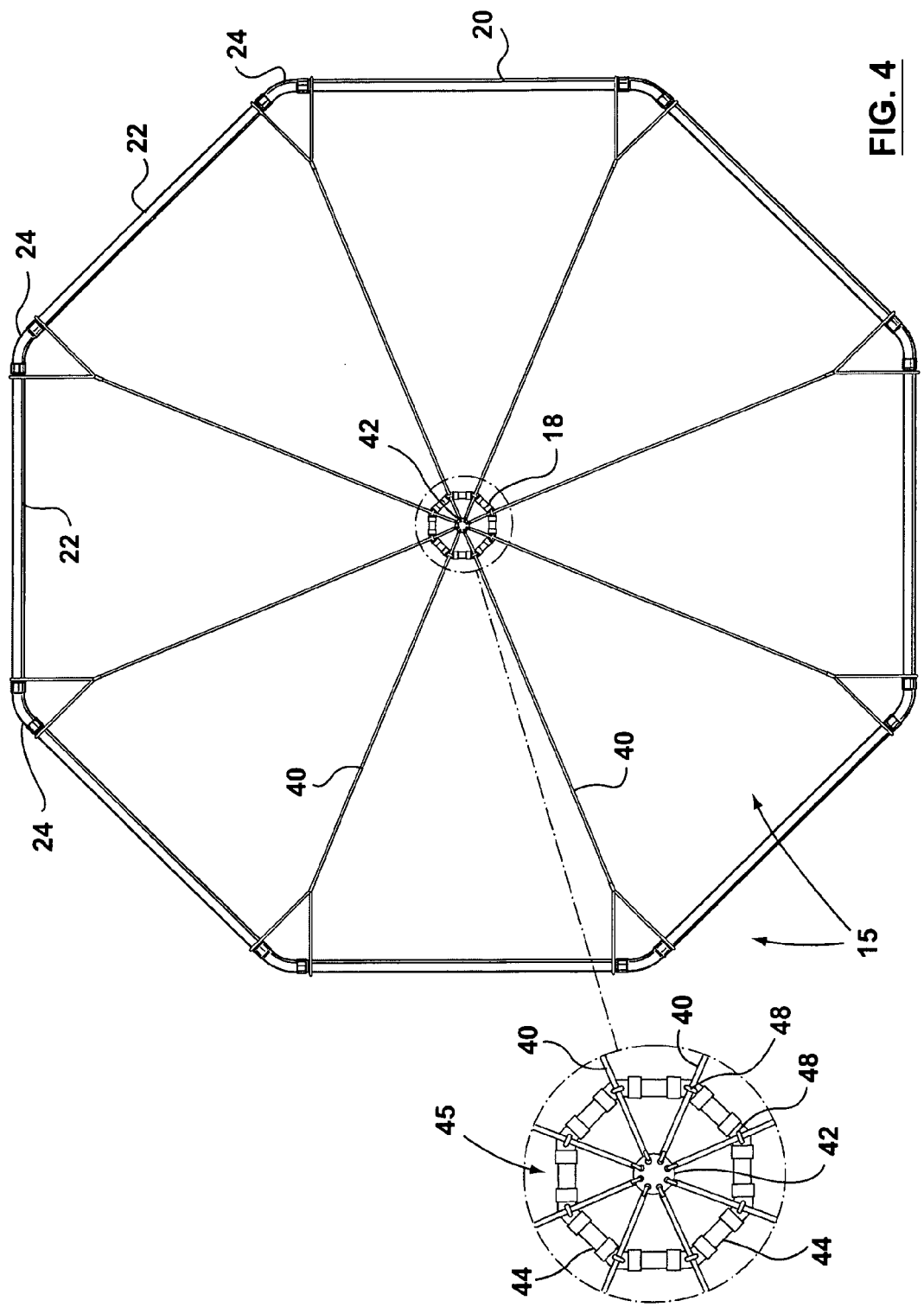

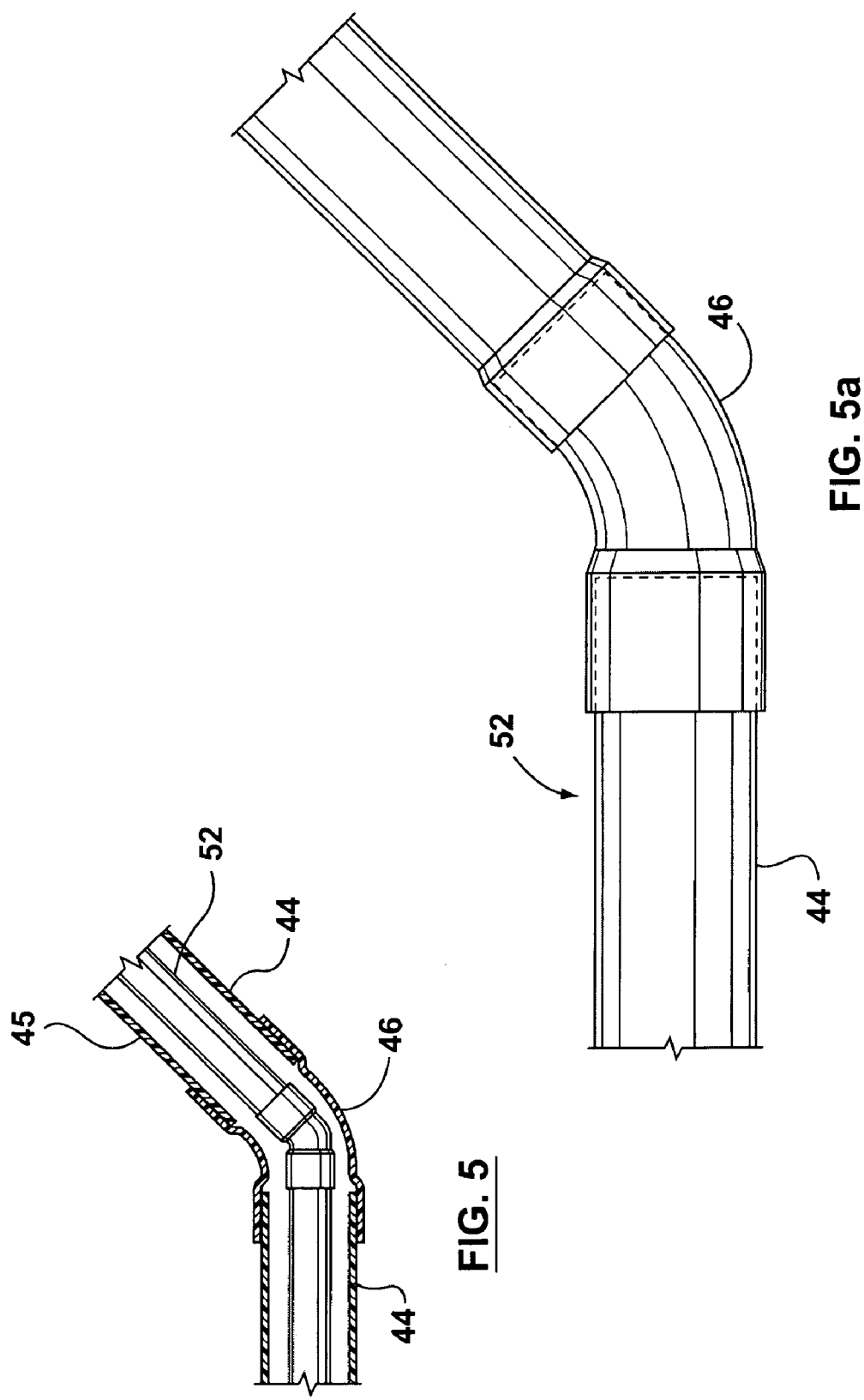

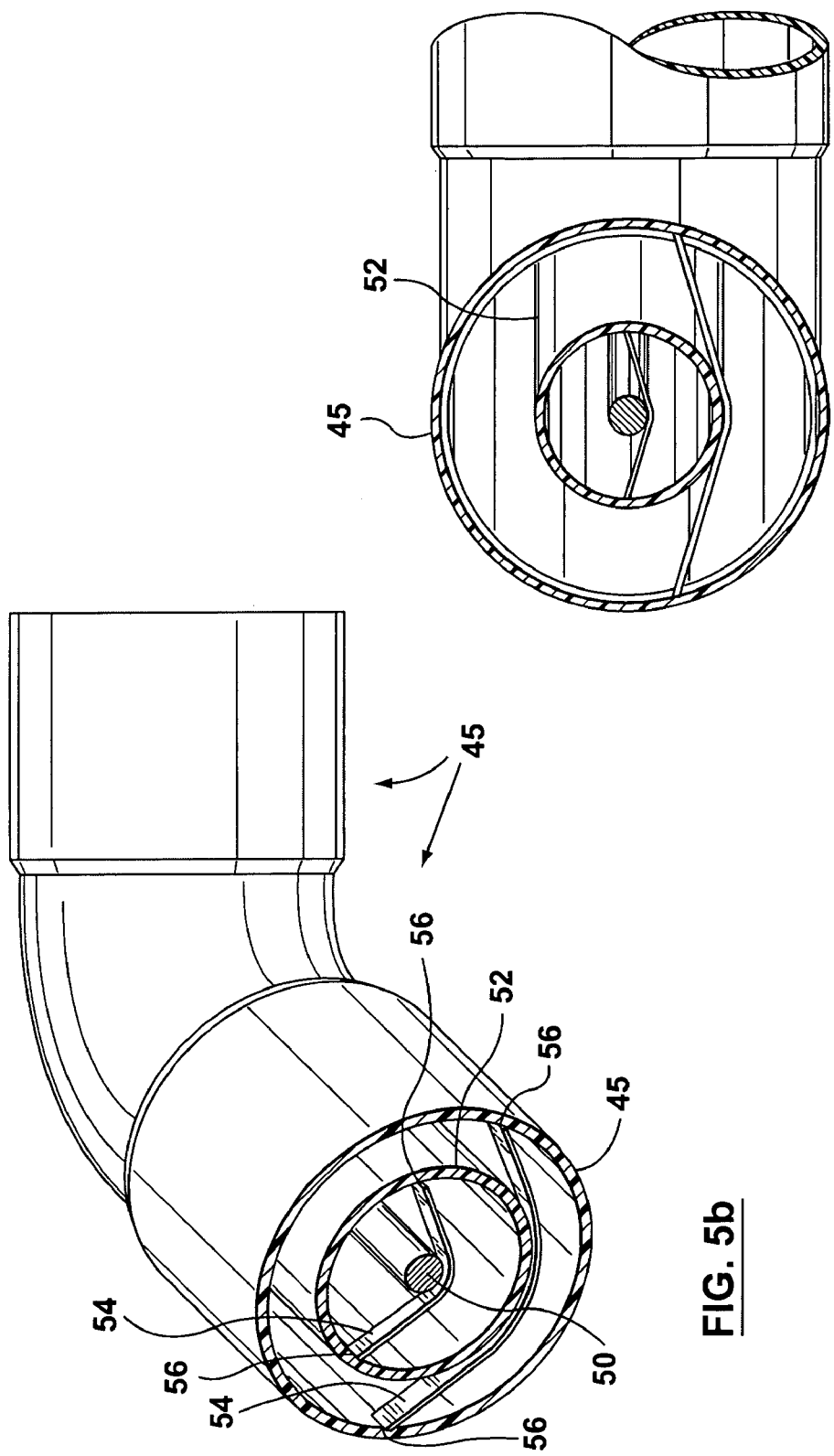

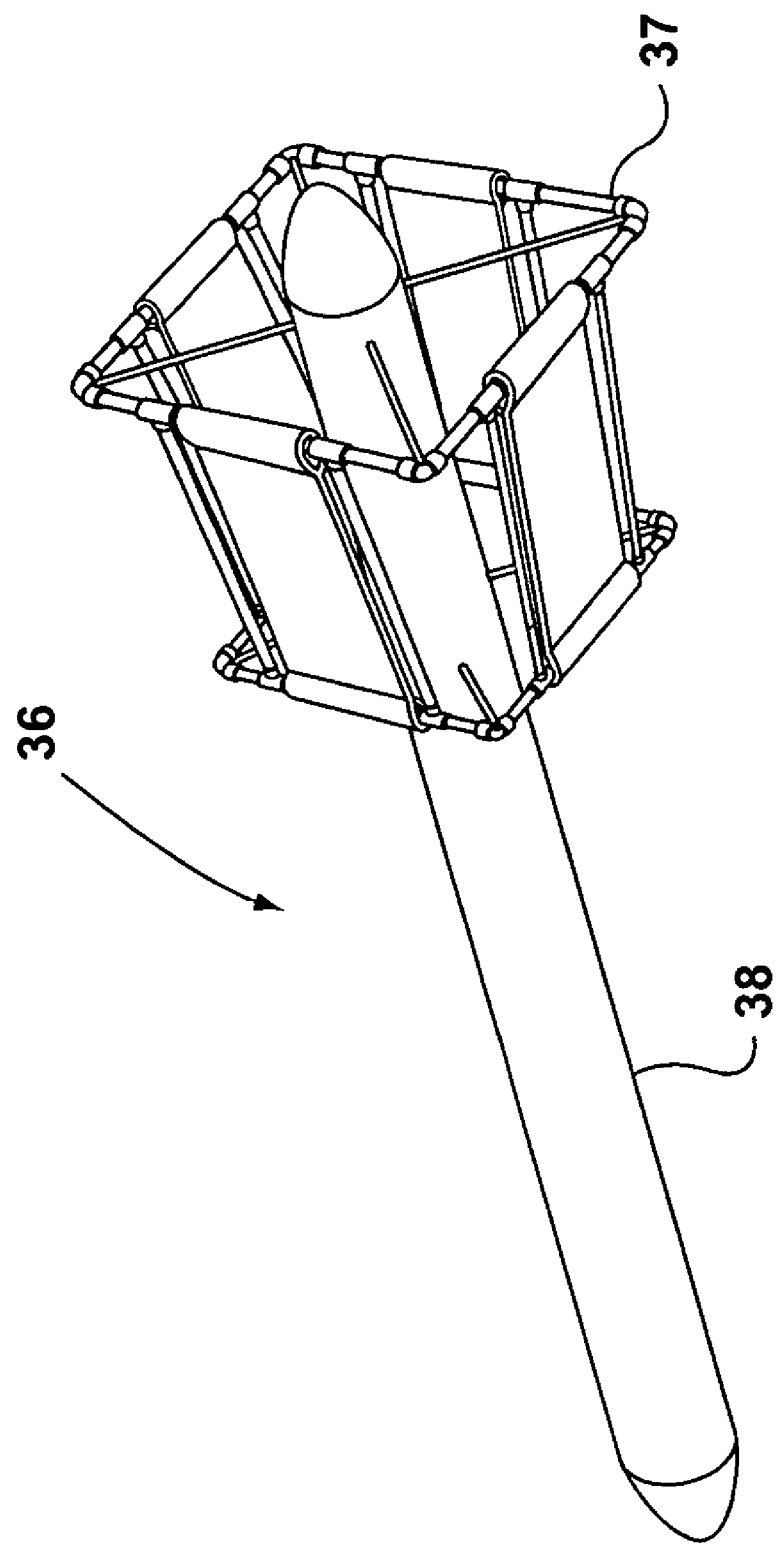

AIRBORNE ELECTROMAGNETIC TIME DOMAIN SYSTEM, COMPUTER PRODUCT AND METHOD

FIELD OF THE INVENTION

This invention relates in general to the field of airborne geological mapping. This invention further relates to an apparatus for conducting geological surveying using an electromagnetic time domain method.

BACKGROUND OF THE INVENTION

Time Domain Electromagnetic (TDEM) surveying is a rapidly developing area of geophysical surveying. It encompasses ground based and airborne applications. TDEM geological mapping involves equations for calculating the value of electromagnetic fields that are time dependent. Geological data is then inferred from the electromagnetic field data based on resistivity factors, in a manner that is known.

The TDEM method was originally designed for exploration of conductive ore bodies buried in resistive bedrock, but at the present time it is also used extensively in general geological mapping, in hydrogeology, in environmental investigations etc.

The method involves generating periodic magnetic field pulses penetrating below the Earth surface. Turning off this magnetic field at the end of each pulse causes an appearance of eddy currents in geological space. These currents then gradually decay and change their disposition and direction depending on electrical resistivity and geometry of geological bodies. The electromagnetic fields of these eddy currents (also called transient or secondary fields) are then measured above the Earth surface and used for mapping and future geological interpretation in a manner that is known.

The common technical means to generate magnetic field pulses is a known transmitter generally consisting of a loop of wire or a multi-turn coil connected to the output of a known electrical current pulse generator or transmitter driver. The typical size of a transmitter coil is a few meters in diameter for an airborne device and up to hundreds of meters for ground systems. Generally, the bigger the transmitter coil diameter the stronger its magnetic moment, which then results in deeper and more accurate investigations.

An additional multi-turn coil or an x-y-z coil system usually serves as a receiver or sensor for the secondary electromagnetic field. Magnetometers are also applicable for this purpose. Received signals are digitised by a known analog to digital converter (ADC) and processed and stored by computer.

The advantage of airborne TDEM systems is the speed with which ground that can be covered in geological surveying. However, there are a number of technical problems in designing airborne TDEM systems based on prior art.

The transmitted electromagnetic fields generally generate eddy currents not only in the Earth but also in the proximate metallic parts including those of the system and the aircraft body. The secondary fields of these currents behave as a noise due to typical instability of the system geometry and thermal changes in conductors. This noise impacts the survey data by generally decreasing their reliability for extrapolating geological data therefrom.

The most common way to minimise this noise is by keeping the receiver at an adequate distance from the transmitter driver. The result of this spaced apart relationship between the transmitter driver and the receiver is that the secondary fields of the eddy currents in the Earth are comparable with secondary fields of local metal parts and therefore noise level is negligible. This type of solution is used in the TDEM systems branded "GEOTEM" and "MEGATEM" of (FUGRO AIRBONE SURVEYS LTD) GEOTERREX PTY. LTD. This particular solution includes a bird towed behind a fixed-wing aircraft on a tow cable approximately 130 meters long.

Another prior art TDEM system consists of a helicopter towed system manufactured by T.H.E.M Geophysics Inc. This system uses a helium balloon to keep its sensor suspended at a distance apart from the transmitter system.

One of the disadvantages of these prior art solutions is that there is relatively poor horizontal resolution of the system due to the relatively long distance between transmitter coil and receiver sensor. Another disadvantage is difficulties of system mechanical management in start/landing and in flight manoeuvres.

Another prior art method currently used to minimise this kind of noise is to cancel the transmitter primary field localised in metal parts of the system using special coils producing in this local area a magnetic field having opposite direction to the main field of the transmitter coils. This technology is used in the AEROTEM™ branded solution of Aeroquest Ltd. in order to minimise the secondary fields in the metal parts of the transmitter electronics, which instead they locate in the towed bird. This solution requires a high level of system mechanical rigidity. In turn, it leads to heavier frame construction. The heavier frame results in a number of disadvantages. In particular the heavier frame makes transportation of the bird difficult. The production costs and fuel costs associated with manufacturing and use of the AEROTEM™ solution are also relatively high.

More importantly, because of the need for a rigid frame having a relatively significant weight, a frame with a generally smaller transmitter coil diameter is selected resulting in a lower transmitter dipole moment. This generally results in insufficient transmitter dipole moment to make deeper measurements.

Another problem with the prior art solutions is that they do not easily permit exploiting optimal system geometry, that is the receiver in the centre of the transmitter coil. A relatively large voltage is induced in the receiver coil by each of the magnetic field pulses. But this relatively high voltage in turn renders the receiver preamp saturated and therefore inoperative during system measurement time for a short period after this pulse. This is an important and necessary time for making measurements of the Earth's response.

As a result, the solution of existing systems is to place the system receiver at a distance away from the transmitter where the transmitted pulse is much lower since the strength of this field diminishes as the inverse cube of the distance. However, this then results in a departure from the optimal system geometry.

In the case of the AEROTEM™ system, the method of dealing with this large voltage pulse while maintaining optimal system geometry, i.e. receiver in centre of transmitter coil, is to place the receiver coil inside a bucking coil carrying the anti-phased transmitter current so as to cancel a large part of the voltage pulse induced in the receiver coil during the transmitter "ON TIME" while not substantially affecting the reception of the secondary field from the Earth.

This approach works well to solve the problem of this on-time voltage pulse problem, however, the process of accurately bucking this signal again mandates the rigid geometry of all parts including the receiver coil. This rigid mounting precludes the proper vibration isolation of the receiver coil thus unwanted mechanical vibration influences the receiver coil so as to induce electrical interference thereby reducing sensitivity.

Another technical problem is how to produce maximum magnetic moment in the transmitter coil using minimum weight, size and electrical power. In the above-mentioned systems a significant part of the total weight is used for the structure and power sources.

Another problem is the air drag of the bird during flight. Complicated support structures with large effective surface areas create excessive drag. This limits possible flight speed increasing survey cost.

Another limitation of the previously mentioned systems is the limitation on the maximum transmitter diameter and therefore obtainable dipole moment. A maximum diameter for these systems is generally attained relatively quickly because the rigidity criterion mandates significant weight of the structure. This stiffness factor forces this type of design to reach the maximum allowable weight for helicopter use before a desirable diameter is attained.

SUMMARY OF THE INVENTION

An object of the present invention is to provide a TDEM system that provides improved sensor resolution.

BRIEF DESCRIPTION OF THE DRAWINGS

FIG. 4 illustrates the tow assembly of the present invention in a top view thereof, and further showing a bottom view of the receiver section of the tow assembly.

FIG. 5 illustrates the structure of the transmitter section of the tow assembly in a partial cut-away view of a joint section thereof.

FIG. 5a illustrates the structure of the transmitter section of the tow assembly in a partial view thereof at a joint section.

FIG. 5b illustrates the structure of the receiver section in a cut-view thereof.

FIG. 5c is a further cut-away view of the receiver section.

FIG. 6 is a view of the stabilizer section of the tow assembly, in accordance with one embodiment thereof.

Figure 1:
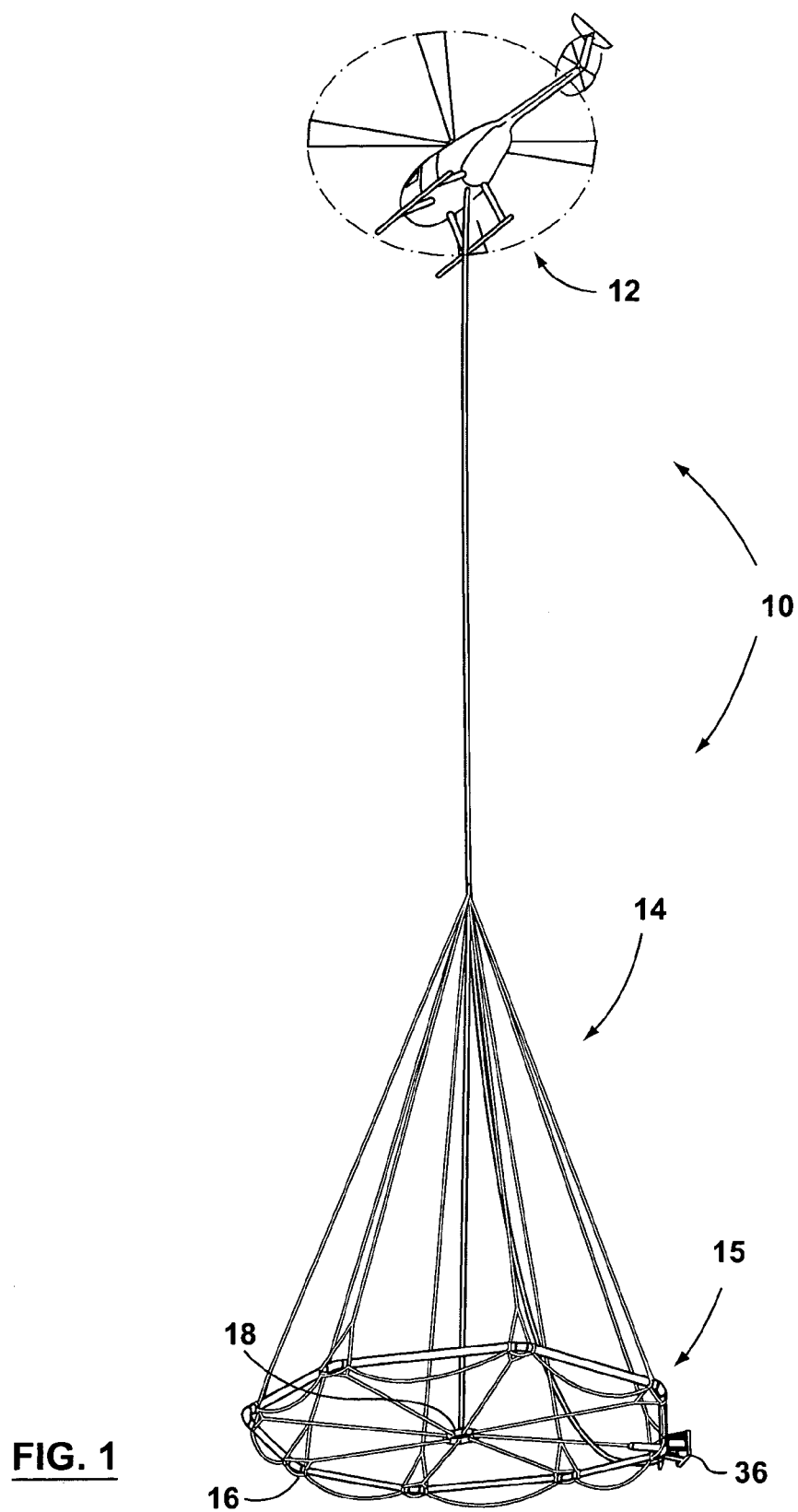
FIG. 1 illustrates the apparatus of the present invention in an airborne position, in this case towed from a helicopter.

In the drawings, one embodiment of the invention is illustrated by way of example. It is to be expressly understood that the description and drawings are only for the purpose of illustration and as an aid to understanding, and are not intended as a definition of the limits of the invention.

DETAILED DESCRIPTION OF THE PREFERRED EMBODIMENT

The present invention consists of an airborne TDEM survey system 10. The TDEM survey system 10 includes an aircraft 12 and a tow assembly 14. FIG. 1 illustrates an aircraft 12 that is a helicopter, however, other aircraft such as airplanes having desirable take-off and landing attributes from a geological survey perspective could also be used.

It should be understood that in one aspect of the present invention the tow assembly 14 is separate from the aircraft 12 but then attached thereto by a suitable attachment means. Provided that the flexible frame discussed below is provided, the tow assembly 14 could be integrated with an aircraft 12 to produce a geological surveying aircraft including a tow assembly 14 in accordance with the present invention.

Figure 2:
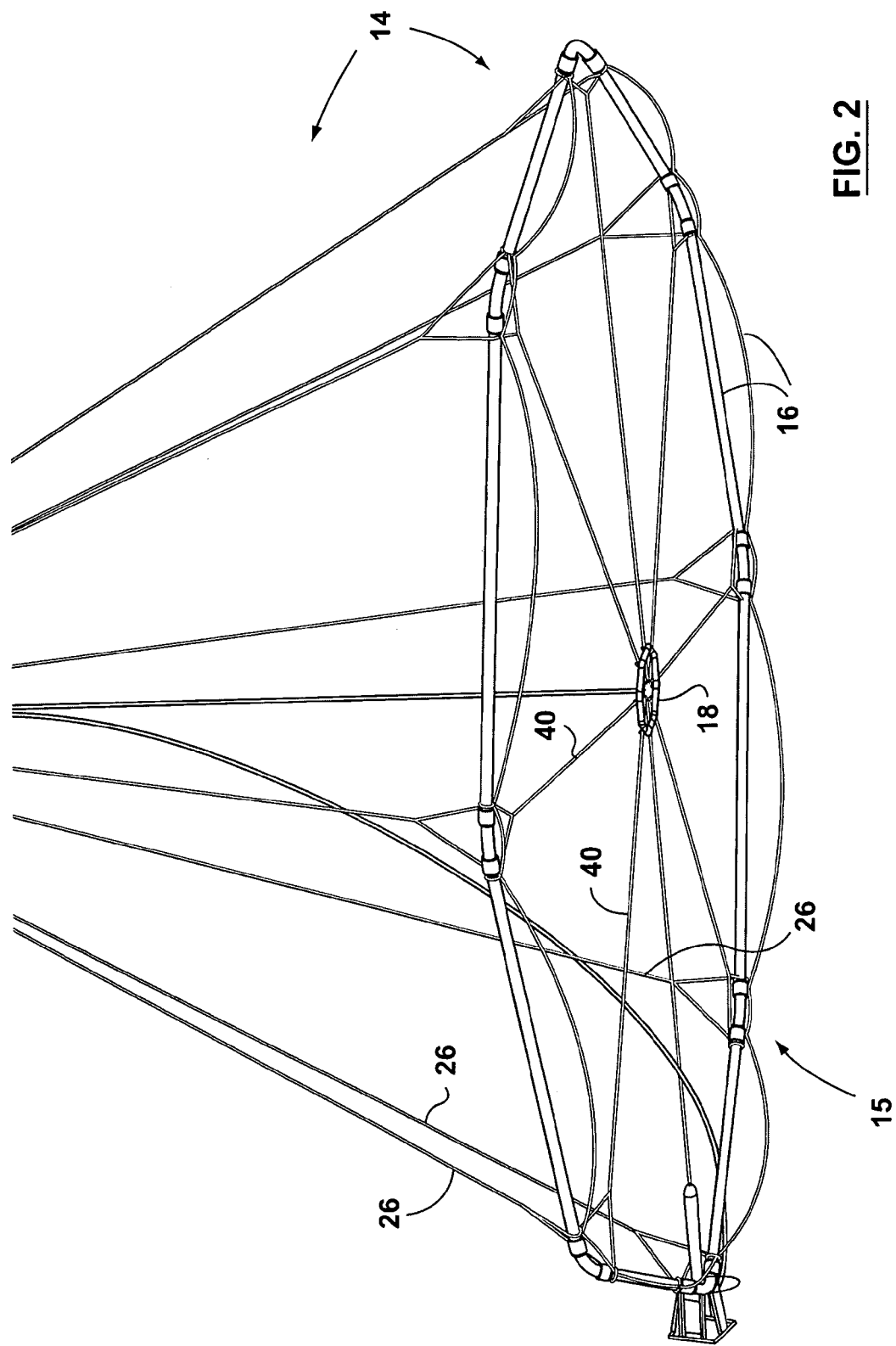
FIG. 2 illustrates the tow assembly of the present invention in a perspective view.

The tow assembly 14 of the present invention generally includes a flexible frame 15, as illustrated in FIG. 2. The flexible frame includes a transmitter section 16 and a receiver section 18. In accordance with the present invention, the receiver section 18 is in most implementations substantially disposed in the center of the transmitter section 16. This generally provides the optimal geometry referred to above.

One aspect of the present invention is the ease in which the tow assembly 14 can be assembled, disassembled and therefore transported from one location to another. Another aspect of the present invention is that the flexible frame 15 overall can be adjusted in terms of its size to suit for particular applications.

To this end, the transmitter section 16, in a particular implementation of the present invention, as shown in FIG. 4, consists of a substantially octagonal support frame 20. The support frame 20 consists of a plurality of substantially tube sections 22. As best shown in FIG. 5a, the various tube sections at the corners are interconnected by means of elbow sections 24.

The tube sections 22 can consist of a single piece, or multiple pieces that can be interconnected. The tubing used in the present invention consists of composite material tubing such as fiberglass or Kevlar. Alternatively, the components (described below) of the support frame 20 can be made of carbon fiber for increased strength, preferably with non-conductive areas along the length of one or more of the components to avoid the anomaly that would be caused by a complete conductive loop.

One embodiment of the support frame 20 of the present invention described consists of tube sections 22 and elbow sections 27 (not shown) whereby adding additional tube sections 22 or multiple pieces together providing one of the tube sections 22, as well as additional elbow sections 24, provides a support frame 20 having a greater surface area. It should be understood that tube sections 22 and elbow sections 24 can be added or removed to increase or decrease the surface area.

While the support frame 20 shown in the Figures has an octagonal shape, it should be understood that the present invention also contemplates support frames 15 having other polygonal shapes, although a polygonal shape approximating a circular shape is generally preferred. It should be understood that the modular pieces together providing the support frame 20 can be modified to provide a support frame 20 having a substantially circular profile. Also, in applications of the present invention where transportation and adjustment of the size of the flexible frame 15 is not required, the support frame can be provided in a single unitary construction, as opposed to the modular construction described above.

It should be understood that the construction of the support flame 20 described herein enables a relatively large surface area while the support frame 20 of the present invention is also relatively lightweight. By way of example only, it was found that the construction described herein easily permitted an increase of the transmitter loop diameter (or more than) up to 26 meters while permitting maneuvering of the aircraft 12 with the tow assembly 14 in tow.

Figure 3:
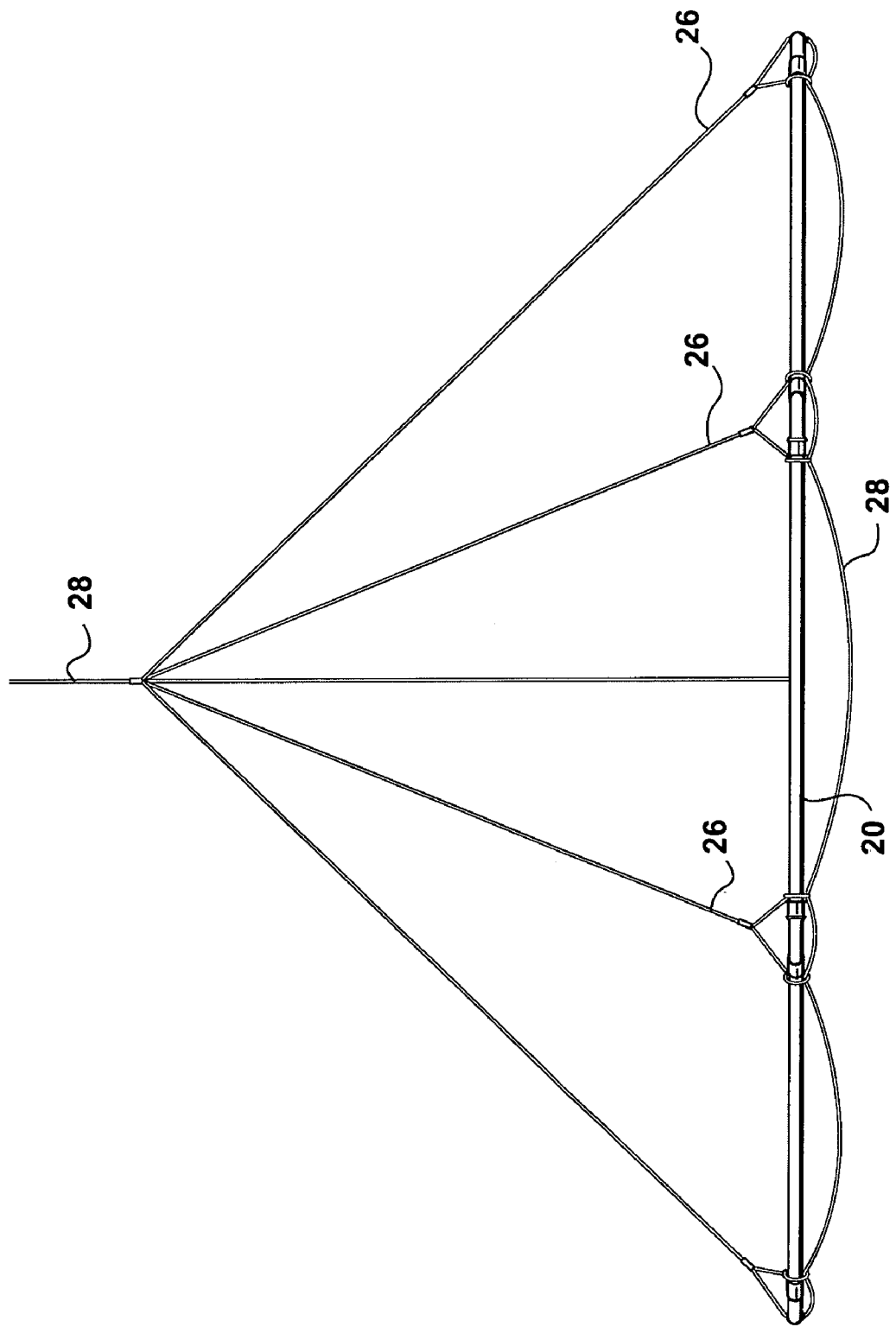
FIG. 3 illustrates the tow assembly of the present invention in an elevation view.

The support frame 20, as best shown in FIG. 3, is suspended using rope 26 from its corners (in the polygonal construction thereof). In a circular construction of the support frame 20, the support frame 20 would be suspended by rope at substantially equidistant points along the circumference thereof.

The rope 26 is then attached to a central tow cable in a manner that is known.

The support frame 20 bears a known multi-turn transmitter coil 28 so as to provide the transmitter function of the transmitter section 16. In the embodiment of the invention shown in FIG. 3, the transmitter coil 28 is strung along the bottom of the support frame 20 by attaching the transmitter coil from multiple points along the support frame 20 by a suitable form of attachment. Alternatively, the transmitter coil 28 can be disposed inside the support frame 20.

In another aspect of the support frame construction of the present invention, the invention also provides flexibility in the ability to make changes in receiver loop turns and loop area, and also by adding receiver coils in other axes, without change to the to disclosed tow assembly 14 configuration.

Figure 8:
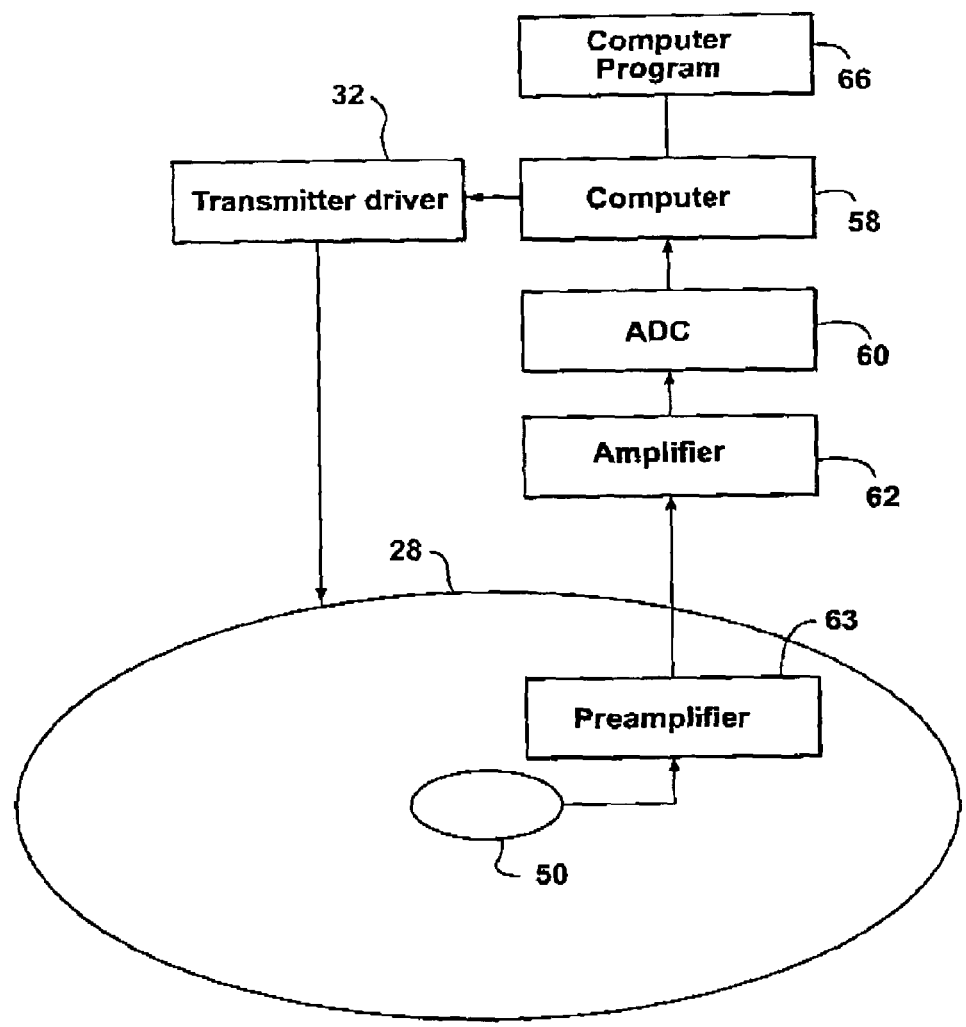
FIG. 8 is a system resource chart illustrating the resources of the system of the present invention.

In accordance with the present invention, a known electronic transmitter driver 32 that feeds the transmitter coil 28 is installed in the aircraft 12. The transmitter driver 32 is connected to the transmitter coil 28 as illustrated in FIG. 8. This connection is generally provided by wiring the transmitter coil 28 to the transmitter driver 32 along the central tow cable and at least one of the ropes 26 supporting the support frame 20.

The flexible frame 20 also includes a stabilizer as shown in FIG. 1. The stabilizer 36, as best shown in FIG. 6, generally has a stabilizer frame 37 that supports an aerodynamically shaped stabilizer tube 38. The stabilizer 36 is generally made of plastic and is connected to the support frame 20 at a point by means of a suitable attachment.

In an embodiment of the present invention, as best shown in FIG. 4, a series of tension ropes 40 are attached to the support frame 20 at various points and then connected to a central hub 42. In the particular embodiment of the support frame 20 shown in FIG. 4, having an octagonal shape, the tension ropes 40 are attached to the corners of the support frame 20. The tension ropes 40 provide some rigidity to the support frame 20.

As best shown in FIG. 4, the receiver section 18 also consists of a plurality of interconnected receiver tube sections 44 together providing a receiver frame 45. These receiver tube sections 44 are also made of plastic and are similar in construction to the tube sections 22 and elbow sections 24 that provide the structure of the support frame 20 in the particular embodiment thereof described herein. The tube sections 44 generally provide, however, a receiver section 18 having a much smaller surface area than that of the receiver section 18 or support frame 20. As best shown in FIG. 5a, the various receiver tube sections 44 are interconnected by means of receiver elbow sections 46.

Much as in the case of the support frame 20, the receiver frame 45 has a modular construction whereby additional receiver tube sections 44 and receiver elbow sections 46 may be added to provide a receiver frame 45 having a greater or lesser surface area. Also similarly, the receiver frame 45 can in accordance with the present invention be provided in accordance with alternate polygonal structures or in fact a circular structure. In addition, a unitary construction as opposed to a modular construction may be desirable.

In accordance with one embodiment of the present invention, the receiver frame 45 is mounted on the tension ropes 40 by leading the tension ropes 40 through a series of loops 48 disposed on the receiver frame 45 as best shown in FIG. 4.

The receiver frame 45 is provided with a sensor coil 50. Sensor coil and or sensor loop are synonymous terms being used interchangeably throughout. In accordance with an embodiment of the present invention, the sensor coil 50 is disposed inside a shell 52 disposed inside the receiver frame 45, as shown in FIGS. 5b and 5c. The shell 52 consist of plastic tubing similar to the tubing the receiver tube sections 44 and receiver elbow sections 46, but having a smaller circumference.

In addition, the shell 52 is elastically suspended using a series of elastics 54 (one shown only) attached to points 56 along the inner wall of the receiver frame 45 tubing and elastically supporting the shell 52. The sensor coil 50, in turn, is elastically supported by a series of elastics 54 (one shown only) attached to points 56 along the inner wall of the shell 52.

The elastic suspension of the sensor coil 50 inside the shell 52 minimizes the effect of vibration.

In one particular embodiment of the present invention, the sensor coil 50 output is connected to a non linear preamplifier 63 mounted in a box on the shell 52 outer surface (not shown). This is illustrated in FIG. 8.

The result of the above is that metallic parts except wires and the preamplifier 63 are generally concentrated in the aircraft 12 far enough from field generating and the sensitive components of the flexible frame 12. This results in relatively small parasitic eddy currents whereby useful signals dominate.

A further result of the tow assembly construction described above, is that the tow assembly consists generally of the tubular fiberglass parts described above whereby generally more than a half of the bird weight belongs to transmitter coil wires.

Generally a transmitter coil 30 having relatively thick wires with low resistance that can reach higher intensity of the transmitting magnetic field is used. Of course, the overall weight must not exceed values that would otherwise unduly burden the aircraft 12 or negatively affect maneuverability.

In addition to the fiberglass or carbon fiber tubing, the tow assembly 14 uses the ropes discussed above. This reduces the need for additional plastic or metal spokes. The ropes reduce air drag and allows for higher flight speed.

As best illustrated in FIG. 8, the system of the present invention also includes a signal-processing computer 58. The computer 58 includes a known analog to digital converter device (ADC) 60. The output of the preamplifier is connected in sequence to a known amplifier 62, low pass filter 64 and then the ADC 60, in a manner that is known. The ADC converts the analog data produced by the sensor coil 50 and preamplifier in combination to produce digital data for digital data conversion as described below.

Figure 7:
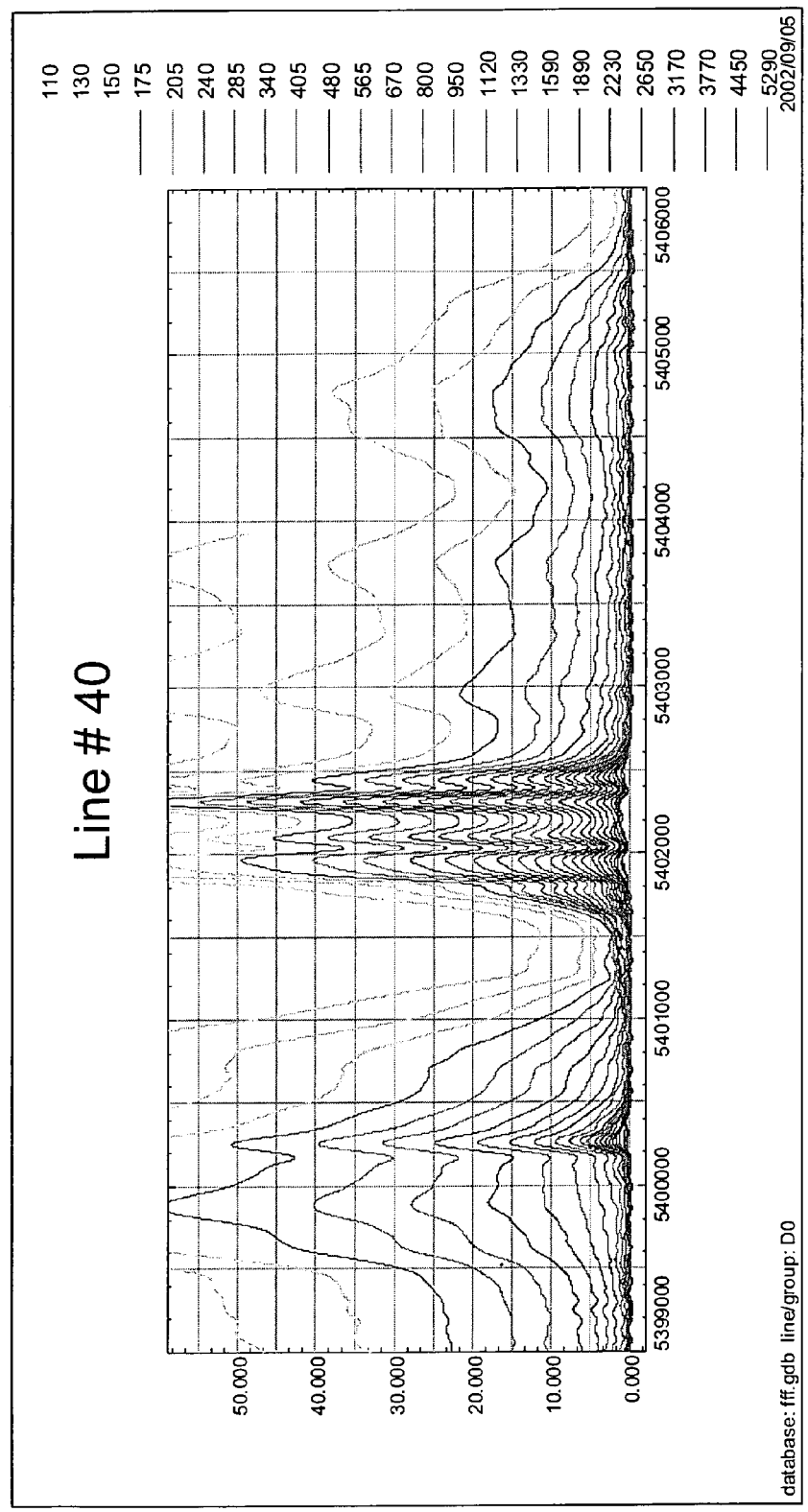
FIG. 7 is a chart illustrating the survey data generated by the tow assembly of the present invention in operation.
Figure 9:
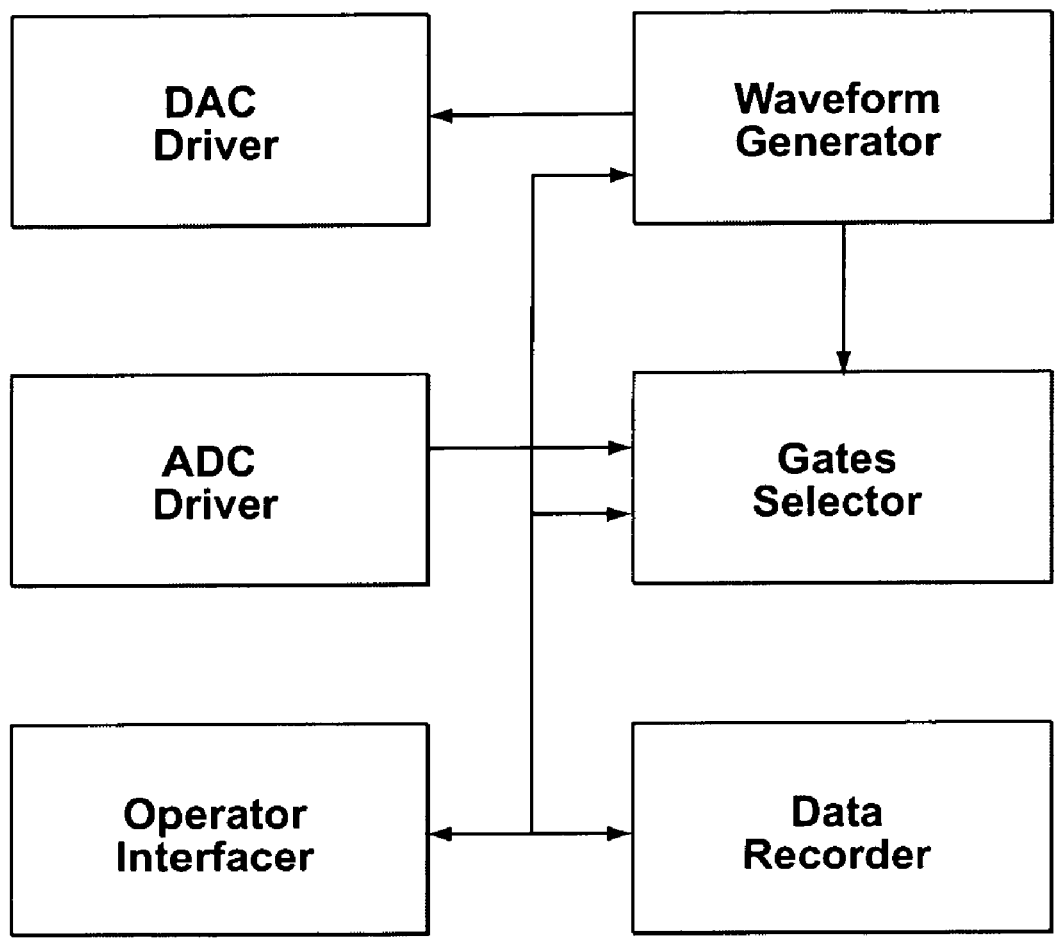
FIG. 9 is a program resource chart that illustrates the resources of the computer product of the present invention.

The signal from the sensor coil 50, which is proportional to dB/dt, goes through the amplifier 62 and low pass filter 62. The ADC 60 continuously converts the signal to digits. The computer 58 includes a microprocessor (not shown) and is linked to a memory. A computer program 66 is installed on the computer 58 for analyzing the digital data to produce the survey data illustrated in FIG. 7. The computer program can produce arbitrary output waveforms including square, trapezoidal and triangular waveforms in order to meet the particular survey requirements. The computer program 66 also permits pulse repetition rate to be dynamically altered to lower repetition rates being more suitable for very conductive targets or higher for less conductive targets. FIG. 9 illustrates the resources of this computer program.

The sensor coil 50 parameters define the necessary sensitivity so that the signal does not exceed the input range of the non linear preamplifier.

The preamplifier 63 is a differential amplifier with a specially designed, fast recovery, dual-mode gain. In relation to the TDEM process, the differential amplifier has a high linear gain of the signal within a set range equal to the expected measurement signal level with the pulse off and rapidly turns the amplified signal to low gain when the signal exceeds this limit during the "on " pulse. In that way the preamplifier limits output voltage during "ON TIME" pulse and provides low distortion and has fast recovery and high gain during off time.

This in turn allows the sensor coil 50 to be placed in the optimal position in the center of the transmitting section 16 without the need for any bucking of the primary transmitted pulse. This then allows the use merely of vibration isolation of the sensor coil 50 (as described above) thus increasing our signal to noise ratio.

By using this dual-mode gain amplifier method over the bucking method, a transmitter loop diameter and corresponding size of the support frame, as well as the number of loop turns can be selected to suit particular geological targets simply and on site.

Alteration of these parameters in the context of a bucking system is generally discouraged because the bucking system would be lose effectiveness in the advent of such alteration. Thus the bucking method is generally less flexible than the present invention.

In another aspect of the invention, the support frame 20 is also adapted to measure the signal during the on-time so as to provide in-phase information. This has been found to improve survey data, for example, in the case of ore bodies of relatively high conductance, for example, nickel. This is achieved by taking signal off of the transmitter coil 28, or alternatively a separate receiver coil is looped tightly to the transmitter coil for this purpose.

In another aspect of the invention a current measuring unit (not shown) is added to the system of the present invention. The current measuring unit measures the residual currents circulating in the transmitter coil 28 during the "OFF" interval thereby enabling the system to minimize distortions caused by these residual currents to the earth response to the electromagnetic field pulse. This is especially important in the time immediately after the transmit pulse when current leakage and current oscillations may exist for a short time. These currents cause errors in the received signals. One implementation of the current measuring unit consists of an air-core transformer and preamplifier which is then connected to an AD converter. The transformer is preferably designed like a Rogowski coil which includes wide dynamic and frequency ranges, high stability and linearity of its characteristics and easy calibration. The primary winding of the transformer is connected in serial with the transmitter coil so that the current flowing through the coil generates emf=M*dI/dt at the secondary winding of the transformer. The signal-processing computer 58 is connected to the transformer and therefore sample signal therefrom much as the receiver signal and uses this data for further correction of the receiver signal. In one particular implementation thereof the current measuring unit is housed in a box (not shown) and is mounted on the tow cable.

Other modifications are possible. For example, additional receiver coils oriented in the X-axis and/or the Y-axis can be added. The use of a mechanically flexible relationship between the transmitter coil and the receiver coil. This simplifies and greatly reduces the necessary weight of the support structure as well as allowing the user to use a much larger loop diameter thus giving the system higher dipole moment. The ability to rotate the entire structure 90 degrees so that the transmitter flies in the X-axis direction thus allowing for better detection of vertical conductive bodies.

What is claimed is:

1. An airborne time domain electromagnetic surveying system comprising:
   (a) A tow assembly for connection to an aircraft, the tow assembly including:
      (i) A flexible support frame including:
         (A) A transmitter section having a central axis and including a transmitter means; and
         (B) A receiver section including a receiver support frame and a sensor means;
      wherein the receiver section is substantially aligned with the central axis of the transmitter section; and
      wherein the sensor means is flexibly connected to the receiver support frame for vibration reduction;
   (b) A transmitter driver linked to the transmitter section in a spaced apart relationship from the transmitter section, such spaced apart relationship being operable to reduce noise, wherein the transmitter driver and transmitter section in cooperation enable the system in an "ON" interval to generate an earthbound electromagnetic field pulse effective for geological surveying, and wherein an earth response to the electromagnetic field pulse is sensed in an "OFF" interval by the sensor means; and
   (c) A dual-mode gain amplifier linked to the sensor means that enables low linear gain amplification during the "ON" interval and switches to non-bucking high linear gain amplification during the "OFF" interval, wherein the switch is rapidly achieved.

2. An airborne time domain electromagnetic surveying system as claimed in claim 1, wherein the structure of the support frame enables a relatively large effective surface area with reduced drag during flight.

3. An airborne time domain electromagnetic surveying system as claimed in claim 1, wherein the transmitter driver and the dual-mode gain amplifier are connected to a computer including a control program, wherein the computer is adapted to activate the pulse to define the "ON" interval, and to measure the earth response by operation of the sensor means in the "OFF" interval so as to generate selected survey data, which survey data is stored to a memory linked to the computer.

4. An airborne time domain electromagnetic surveying system as claimed in claim 3, wherein the transmitter section includes a sensor for measuring signal during the "ON" interval, and the computer is adapted to generate selected survey data from the "ON" interval signal measurements.

5. An airborne time domain electromagnetic surveying system as claimed in claim 1, wherein the transmitter section includes a generally flexible transmitter support frame, which transmitter support frame supports a transmitter coil.

6. An airborne time domain electromagnetic surveying system as claimed in claim 5, wherein the transmitter section consists of a plurality of interconnectable transmitter section frame members, such that the transmitter section can be assembled and disassembled.

7. An airborne time domain electromagnetic surveying system as claimed in claim 6, wherein the plurality of interconnectable transmitter section frame members enable the surface area of the transmitter section to be altered for different applications of the system.

8. An airborne time domain electromagnetic surveying system as claimed in claim 6, wherein the transmitter section frame members define a polygonal profile.

9. An airborne time domain electromagnetic surveying system as claimed in claim 5, wherein the receiver support frame is connected to the transmitter support frame by means of a plurality of connecting cables.

10. An airborne time domain electromagnetic surveying system as claimed in claim 9, wherein the connecting cables are generally evenly distributed along the circumference of each of the receiver support frame and the transmitter support frame.

11. An airborne time domain electromagnetic surveying system as claimed in claim 1, wherein the tow assembly is connected to the aircraft by means of at least one cable means connected to the transmitter section at a plurality of points.

12. An airborne time domain electromagnetic surveying system as claimed in claim 11, wherein the tow assembly is connected to the aircraft by means of a central cable at a first end connected to the aircraft, the central cable also including a second end opposite to the first end, and wherein a plurality of connecting cables are connected between the second end of the central cable and a plurality of points generally evenly distributed along the circumference of the transmitter section.

13. An airborne time domain electromagnetic surveying system as claimed in claim 1, wherein the sensor means is elastically suspended inside the receiver support frame.

14. An airborne time domain electromagnetic surveying system as claimed in claim 1, wherein the receiver support frame consists of a plurality of interconnectable receiver section frame members.

15. An airborne time domain electromagnetic surveying system as claimed in claim 14, wherein the interconnectable receiver section frame members of the receiver support frame can be assembled and disassembled.

16. An airborne time domain electromagnetic surveying system as claimed in claim 1, wherein the transmitter driver is located in the aircraft and is connected by a transmission cable to the transmitter section.

17. An airborne time domain electromagnetic surveying system as claimed in claim 1, wherein the support frame further includes a stabilizer for stabilizing the movement of the tow assembly during flight.

18. An airborne time domain electromagnetic surveying system as claimed in claim 1, wherein the aircraft is a helicopter.

19. An airborne time domain electromagnetic surveying system as claimed in claim 1, wherein residual currents circulate in the transmitter means during the "off" interval, and wherein the system further comprises a current measuring unit that measures the residual currents thereby enabling the system to minimize distortions caused thereby to the earth response to the electromagnetic field pulse.

20. A method of producing survey data comprising the steps of:

(a) flying an aircraft with a lightweight survey tow assembly connected thereto, the tow assembly including:
  (i) A flexible support frame including:
    (A) A transmitter section in including a transmission means; and
    (B) A receiver section including a sensor means;
  (ii) A transmitter driver linked to the transmitter means in a spaced apart relationship from the transmitter section, such spaced apart relationship being operable to reduce noise, wherein the transmitter driver and transmitter means in cooperation enable the system to generate an earthbound electromagnetic field pulse effective for geological surveying; and
  (iii) A dual-mode gain amplifier linked to the sensor means that enables non-bucking high linear gain amplification of the earth response to the electromagnetic field pulse;
Wherein the receiver section is substantially aligned with the central axis of the transmitter section;
(b) Generating an earthbound electromagnetic field pulse effective for airborne geological surveying in an "ON" interval;
(c) Sensing the earth response to the electromagnetic field response in an "OFF" interval;
(d) Amplifying the earth response in the "OFF" interval by means of the dual-mode gain amplifier wherein the amplification switches to low linear gain during the "ON" interval; and
(e) Obtaining geophysical survey data from the amplified electromagnetic field response.

21. The method claimed in claim 20, further comprising collecting in-phase information in the "ON" interval by means of a receiver means linked to the transmitter section.

22. The method claimed in claim 20, further comprising adjusting the surface area of the transmitter section for specific survey applications.

23. The method claimed in claim 20, further comprising adding additional receiver coils for multi-dimensional surveying.

24. The method as claimed in claim 20, wherein said sensor means comprise a sensor loop having loop turns, the method further comprising increasing the number of loop turns to suit the particular geophysical targets.

25. The method of claim 20, wherein residual currents circulate in the transmitter coil during the "OFF" interval, the method further comprising measuring the residual currents by means of a current measuring unit, and thereby enabling distortions caused thereby to the earth response to the electromagnetic field pulse to be minimized.

26. An airborne time domain electromagnetic surveying system comprising:
(a) A tow assembly for connection to an aircraft, the tow assembly including:
  (i) A flexible support frame including:
    (A) A transmitter section including a transmitter means; and
    (B) A receiver section including a sensor means;
(b) A transmitter driver linked to the transmitter section in a spaced apart relationship from the transmitter section, such spaced apart relationship being operable to reduce noise, wherein the transmitter driver and transmitter section in cooperation enable the system to generate an earthbound electromagnetic field pulse effective for geological surveying; and (c) A gain amplifier linked to the sensor means that enables non-bucking high linear gain amplification of the earth response to the electromagnetic field pulse;

wherein an electromagnetic field pulse effective for airborne geological surveying is generated in an "ON" interval, an earth response to the electromagnetic field response is sensed in an "0FF" interval and residual currents circulate in the transmitter means during the "OFF" interval, wherein the system further comprises a current measuring unit that measures the residual currents thereby enabling the system to minimize distortions caused thereby to the earth response to the electromagnetic field pulse.

27. A method of producing survey data comprising the steps of:
  (a) flying an aircraft with a lightweight survey tow assembly connected thereto, the tow assembly including:
    (i) A flexible support frame including:
      (A) A transmitter section in including a transmission means; and
      (B) A receiver section including a sensor means;
    (ii) A transmitter driver linked to the transmitter means in a spaced apart relationship from the transmitter section, such spaced apart relationship being operable to reduce noise, wherein the transmitter driver and transmitter means in cooperation enable the system to generate an earthbound electromagnetic field pulse effective for geological surveying; and
    (iii) A gain amplifier linked to the sensor means that enables non-bucking high linear gain amplification of the earth response to the electromagnetic field pulse;
    Wherein the receiver section is substantially aligned with the central axis of the transmitter section;
  (b) Generating an earthbound electromagnetic field pulse effective for airborne geological surveying in an "ON" interval;
  (c) Sensing the earth response to the electromagnetic field response in an "OFF" interval;
  (d) Amplifying the earth response by means of a gain amplifier; and
  (e) Obtaining geophysical survey data from the amplified electromagnetic field response; and
  (f) Measuring residual currents circulating in the transmission means during the "OFF" interval by means of a current measuring unit, and thereby enabling distortions caused thereby to the earth response to the electromagnetic field pulse to be minimized.

* * * * *